United States Patent
Edwards

(10) Patent No.: US 11,363,113 B1
(45) Date of Patent: Jun. 14, 2022

(54) DYNAMIC MICRO-REGION FORMATION FOR SERVICE PROVIDER NETWORK INDEPENDENT EDGE LOCATIONS

(71) Applicant: Amazon Technologies, Inc., Seattle, WA (US)

(72) Inventor: J. Bret Edwards, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/905,009

(22) Filed: Jun. 18, 2020

(51) Int. Cl.
*G06F 15/16* (2006.01)
*H04L 67/289* (2022.01)
*H04L 67/288* (2022.01)

(52) U.S. Cl.
CPC .......... *H04L 67/289* (2013.01); *H04L 67/288* (2013.01)

(58) Field of Classification Search
CPC .............. H04L 67/289; H04L 67/288; G06F 2009/4557; G06F 9/5077; G06F 9/5083
See application file for complete search history.

(56) References Cited

U.S. PATENT DOCUMENTS

| | | | |
|---|---|---|---|
| 2011/0238791 A1* | 9/2011 | Nadeau | H04L 67/289 709/219 |
| 2018/0359323 A1* | 12/2018 | Madden | H04L 67/2871 |
| 2019/0068438 A1* | 2/2019 | Kumar | H04L 41/00 |
| 2019/0109772 A1* | 4/2019 | Lipstone | H04L 47/70 |
| 2020/0409761 A1* | 12/2020 | Stuntebeck | G06F 9/5077 |

* cited by examiner

*Primary Examiner* — Richard G Keehn
(74) *Attorney, Agent, or Firm* — Nicholson De Vos Webster & Elliott, LLP

(57) ABSTRACT

Techniques for dynamic micro-region formation for service provider network independent edge locations are described. A set of services corresponding to services of the service provider network can be deployed to a separate, customer-managed datacenter. The services may be used privately by the customer or publicly by other users using the same or similar interfaces as are utilized for the services within the service provider network. These deployed independent edge locations can be grouped dynamically based on distance in terms of latency to result in micro-regions that users can use, e.g., to launch compute resources into.

20 Claims, 11 Drawing Sheets

DEPLOY INDEPENDENT EDGE LOCATION

⬅ STEP 3 – CONFIGURE PUBLIC AVAILABILITY, RESOURCE UTILIZATION LEVELS ➡

PUBLIC AVAILABILITY — 205

☑ ALLOW PUBLIC AVAILABILITY OF LOCALLY-DEPLOYED SERVICES

RESERVE RESOURCES FOR PRIVATE USE

☑ PERCENTAGE-BASED RESERVATION — 210

[ 15% ▼ ] PERCENTAGE RESERVED FOR PRIVATE USE

☑ RESOURCE RESERVATIONS

[ 20 ▼ ] vCPUS
[ 750 GB ▼ ] MEMORY — 215
[ 15 TB ▼ ] STORAGE

SPREAD POLICY

○ WIDE    ● MEDIUM — 220

CONTROL PLANE UTILIZATION
CONFIGURE MAXIMUM ALLOWABLE RESOURCE UTILIZATION FOR CONTROL PLANE INSTANCES

[ AUTO ▼ ] MAX vCPU
[ AUTO ▼ ] MAX MEMORY — 225
[ AUTO ▼ ] MAX STORAGE

[ BACK ]   [ CONTINUE ]

*FIG. 2*

DYNAMIC MICRO-REGION FORMATION FOR SERVICE PROVIDER NETWORK INDEPENDENT EDGE LOCATIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Cloud computing platforms, also referred to as service provider networks, provide on-demand, managed computing resources to customers. Such computing resources (e.g., compute and storage capacity) are often provisioned from large pools of capacity installed in data centers. Thus, these service provider networks typically offer a variety of services to their users using multiple data centers located in multiple different geographic locations. For example, service provider networks often rely on data centers placed geographically close to its users, and thus are often placed in or near major population centers across the globe. Some service provider networks also utilize "edge locations," which include using computing hardware for providing service that is deployed even closer to large numbers of users, such as within communication service provider networks, within buildings inside of dense urban areas, or the like. Accordingly, customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which:

FIG. 2 is a diagram illustrating an exemplary graphical user interface for configuring public availability of an independent edge location of a service provider network according to some embodiments.

DETAILED DESCRIPTION

Figure 1:
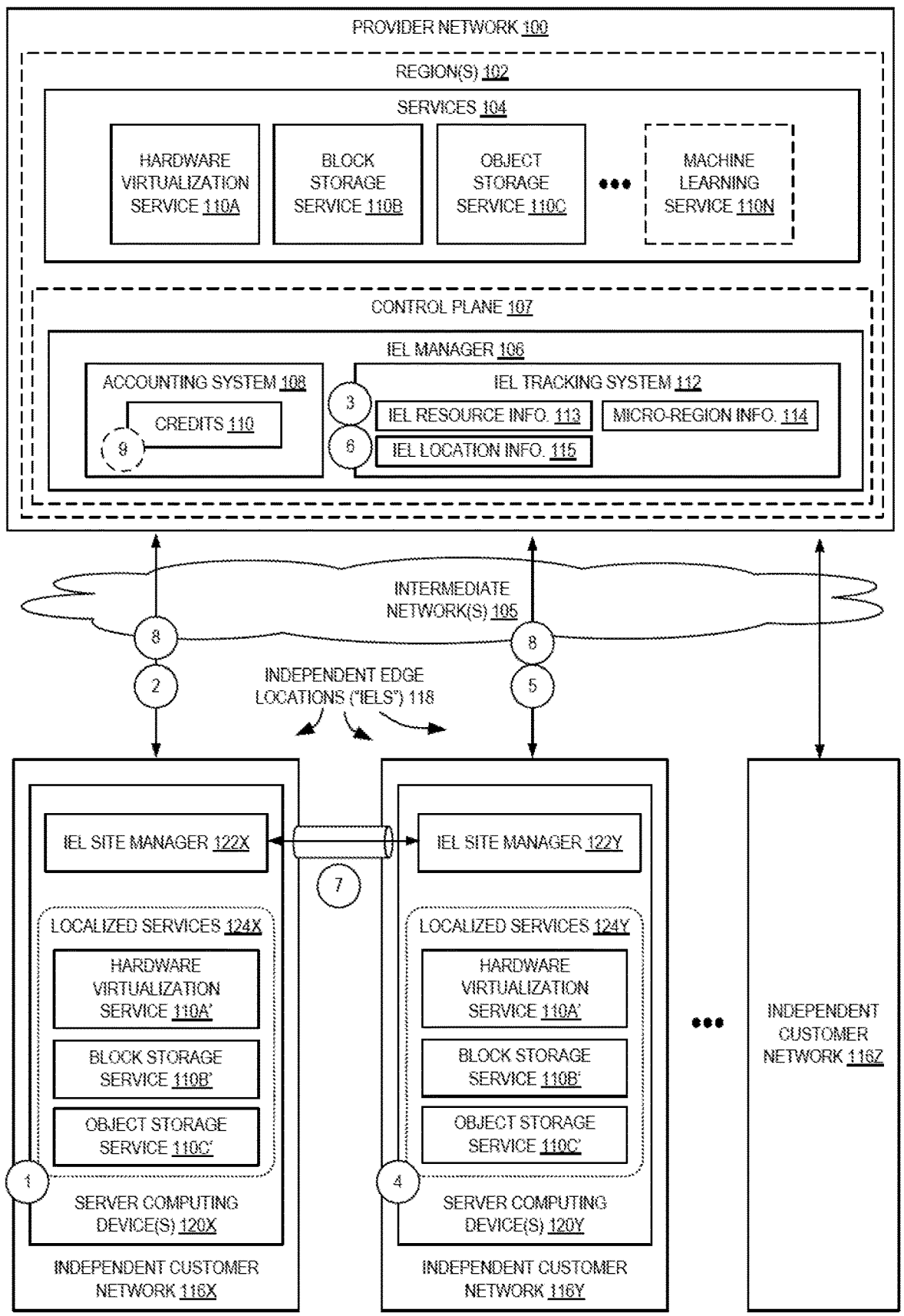
FIG. 1 is a diagram illustrating an environment for dynamic micro-region formation for service provider network independent edge locations according to some embodiments.

The present disclosure relates to methods, apparatus, systems, and non-transitory computer-readable storage media for dynamic micro-region formation for independent edge locations of a service provider network. According to some embodiments, the software-based control plane infrastructure for implementing one or more services of a service provider network can be deployed into an independent customer network to form an independent edge location associated with the provider network. The independent customer networks may then provide these same services (as provided by the service provider network) "locally," and the independent customer networks may be reserved for use by a single customer or made available—in whole or in part, subject to the preferences of the deploying customer—to other users. In some embodiments, multiple independent edge locations can be dynamically grouped together, e.g., to group neighboring independent edge locations having sufficiently low latency network communications therebetween into a micro-region that users can utilize. A customer deploying the service control plane infrastructure to their independent customer network may receive credits based on amounts of the resources provided to other users, which can be used by the customer for utilizing resources from other independent edge locations, the service provider network itself, etc. In some embodiments, the services deployed at independent edge locations may operate using common interfaces (e.g., application programming interface (API) calls) as the primary services in the service provider network, which may beneficially enable customer applications to simply utilize services from the independent edge locations without substantial code rewriting. Independent edge locations, in some embodiments, may be able to seamlessly operate even during significant periods of time without network connectivity to the service provider network itself, allowing for independent customer networks to provide these services of the service provider network in geographically or otherwise remote/underserved locations of the world. For example, by deploying local versions of cloud services, independent edge locations may be able to carry out non-steady-state operations (e.g., creation, modification, and deletion of resources) in addition to steady-state operations (e.g., management of currently running resources), even when disconnected from the rest of the service provider network.

A cloud provider network, or just "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands Cloud computing can thus be considered as both the applications delivered as services (e.g., web services) over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

Segments of a cloud provider network—referred to herein as a "provider substrate extension" (PSE) or "edge location" (EL)—can be provisioned within a network that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access a provider substrate extension via the cloud provider substrate or another network and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a separate control plane of the cloud provider network.

In some embodiments, yet another example of a provider substrate extension is a network deployed within a communications service provider network, which also may be referred to as a "wavelength zone." Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

In these cases, the computing resources of the cloud provider network installed within another location are sometimes referred to "edge locations" because they are closer to the "edge" where end users connect to a network than computing resources existing in a centralized data center. Such edge locations may include one or more networked computer systems that provide customers of the cloud provider network with computing resources to serve end users with lower latency than would otherwise be achievable if those compute resources were hosted in a data center site.

To implement edge locations, service provider networks typically place their own hardware in the edge locations that is used for customer "data plane" traffic and operations, and these edge locations largely continue to utilize the "control plane" provided by the service provider network itself, e.g., in a region of the service provider network. Accordingly, due to the often resource constrained environments providing an edge location, the computing resources are largely reserved for directly performing customer operations (e.g., launching compute instances, providing database services, performing machine learning tasks, etc.) while the control plane operations (e.g., managing the hardware and software resources of the edge location, processing customer requests, etc.) are left to the logically centralized service provider network control plane.

However, in embodiments disclosed herein, customers may deploy control plane infrastructure for one or more services to their independent customer network. This control plane infrastructure and the computing resources (e.g., server computing device(s)) of the independent customer network that are managed by the control plane infrastructure can be used—independent of the service provider network—to provide the one or more services to the customer and/or to other users. Accordingly, an independent customer network may host services offered by the service provider network without needing constant or significantly fast/broad connectivity to the service provider network. Moreover, in some embodiments, multiple independent customer networks of potentially multiple different customers can automatically be joined together to form a micro-region (associated with the service provider network) that can be used by users as a unit, potentially relieving users of the need to specify an exact location to satisfy their calls, to ensure available capacity for users and/or allow different independent customer network based on different conditions, etc.

For example, FIG. 1 is a diagram illustrating an environment for dynamic micro-region formation for service provider network independent edge locations according to some embodiments. In FIG. 1, multiple independent customer networks 116X-116Z have deployed a set of localized services 124X-124Y—here, a hardware virtualization service 110A', block storage service 110B', and an object storage service 110C'—corresponding to some of the services 104 provided by the provider network 100, e.g., hardware virtualization service 110A, block storage service 110B, and an object storage service 110C. In some embodiments, this set of localized services 124 includes fewer than all of the services 104 provided via the main provider network 100 (e.g., at least a machine learning service 110N, and potentially more other services are not localized), though this is not a strict requirement.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services 104, such as a hardware virtualization service 110A that can execute compute resources such as compute instances and/or containers, a storage service that can store data objects (e.g., a block storage service 110B that stores block-level data, an object storage service 110C that stores files or other objects), etc. The users (or "customers") of provider networks 100 may utilize one or more user accounts that are associated with a customer account, though these terms may be used somewhat interchangeably depending upon the context of use. Users may interact with a provider network 100 across one or more intermediate networks 105 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane 107 of the provider network 100 that includes "backend" services supporting and enabling the services that may be more directly offered to customers.

A cloud provider network can be formed as a number of regions 102, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions 102 are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

A cloud provider network 100 can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host in the provider network 100 can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM may be provided with one or more IP addresses in the overlay network, and the VMM on a host may be aware of the IP addresses of the virtual machines on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network may broadly be subdivided into two categories: control plane 107 operations carried over a logical control plane and data plane operations carried over a logical data plane. While the data plane represents the movement of user data through the distributed computing system, the control plane represents the movement of control signals through the distributed computing system. The control plane 107 generally includes one or more control plane components—e.g., the independent edge location (IEL) manager 106—distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute resource(s) involved.

As described herein, it may be the case that a provider network 100 may not be able to add data centers or other physical deployments for regions 102 (or other edge locations) near all geographic areas. For example, there may exist a need for high-performance computing type services in an area that may not be sufficiently populated or have stable or broadband network connectivity—e.g., in Antarctica, in remote deserts, rainforests, plains, or mountain ranges, in underground or underwater or space locations, etc. Accordingly, a user having a set of server computing devices (e.g., server devices 120X) can create a smaller version of the provider network by deploying a set of localized services (e.g., services 124X) within the independent customer network 116X to form an independent edge location 118 (or "IEL").

For example, in some embodiments a user may download a package or otherwise obtain a package (e.g., obtain a computer-readable storage media, such as a USB drive or portable storage device, storing the package) and use it to deploy the base components of one or more services 104 so that these localized services 124X can be run entirely—or nearly entirely—locally within the independent customer network 116X, as shown at circle (1). For example, a user may interact with the provider network 100 to define a package—e.g., by selecting one or more services 104 to be packaged up—and downloading a package including the software needed to instantiate the control plane components of these services.

For example, the package may include a set of base machine images, or include references (e.g., one or more URLs, IP addresses, or the like) to where a set of base machine images can be downloaded from. The set of base machine images may include a distributable form of an operating system with, for example, a containerization environment (e.g., Docker) along with a set of containers for a set of control plane components needed to deploy a control plane for the selected service(s).

In some embodiments, the launch of service functionality may be layered according to a bootstrapping type technique. For example, in some embodiments the deployment of the hardware virtualization service 110A' may be performed first (e.g., via running one or more containers), and another service (e.g., an object storage service 110C') may be deployed using the hardware virtualization service 110A' (e.g., as virtual machine instances running on hosts running the hardware virtualization service 110A'), and so on, whereas the services may be implemented as building blocks "on top" of one another.

The launch of the functionality may also include deploying an independent edge location (IEL) site manager 122 service, e.g., to perform various management functions within the IEL 118, such as accounting, traffic routing, and the like.

In some embodiments, the deployment can rely on auto-detection techniques known to those of skill in the art, e.g., to set up the networking between the components of these services. By way of example, in some embodiments the launch bootstrapping may utilize a network-based booting (e.g., Preboot eXecution Environment (or "PXE", most often pronounced as pixie) boot) by, for example, placing a host on a separate network segment or VLAN for a PXE boot process to obtain a base image (as a PXE boot server may be configured to only serve that segment for the initial bootstrapping), and then flip the instance back to a production network segment or VLAN.

In some embodiments, the autodetection may use techniques known to those of skill in the art such as link layer discovery, e.g., using a broadcast identifier built into the bootstrapping process that may report directly or indirectly (e.g., via the IEL site manager 122) to the IEL manager 106 information about the instances/hosts, e.g., an identifier of the instance/host, an identifier of the functionality of the instance/host, an identifier of how the instance/host is provisioned, etc. The IEL site manager 122 may obtain this information, and may send it back (at some point in time) to the IEL manager 106 at circle (2), where an IEL tracking system 112 may update its IEL resource information 113 at circle (3), e.g., to store and/or update a service availability list associated with the independent customer network, resource availability amounts associated with the independent customer network, and the like. For example, for an IEL, the IEL resource information 113 may include one or more of an identifier of the customer account associated with the IEL, a set of IPv4 and/or IPv6 address spaces it operates using and/or provides, identifiers of the particular services deployed at the IEL, etc.

In some embodiments, when the localized services 124 have been deployed, the user may directly use these services, e.g., using the same APIs/interfaces as would be used with the provider network itself 100, for their own purposes using approved user credentials. In this manner, the localized services 124 are deployed in a "private" IEL 118 and the user can make full use of the localized services 124 and their server computer devices 120.

However, in some embodiments, the user may configure the IEL 118 to at least partially be available for use by other users, e.g., other user accounts associated with the provider network 100. In this manner, a user may create an IEL 118 by deploying a set of one or more localized services to the user's independent customer network and make the IEL 118 at least partially "public." For example, FIG. 2 is a diagram illustrating an exemplary graphical user interface 200 (GUI) for configuring public availability of an independent edge location of a service provider network according to some embodiments. In some embodiments, to initially deploy the set of localized services and form the IEL, a user may utilize a GUI (e.g., provided by the IEL site manager 122 or an installation program) to perform the deployment, which could include confirming which services are to be localized, configuring networking and/or reachability information, configuring which server computing devices in the network can be used by the localized services, and the like.

In some embodiments, the GUI 200 may also allow the user to indicate whether the IEL is to be private (i.e., reserved only for that user or a limited set of approved users) or public (i.e., at least partially made available to other users). As shown, a user interface input element (here, a checkbox) may allow the user to specify whether public availability is to be allowed. When that input element is checked, other user interface input elements may be provided to allow the user to configure how much of the resources are to be shared. For example, user interface elements 210 allow the user to indicate that at least a particular percentage of the overall amount of available resources are to be reserved for the user (i.e., not made available for the public), and then specify that particular desired percentage, e.g., fifteen percent. As another example, the user interface input elements 215 allow the user to indicate that a minimum amount of computing resources are to be reserved for the user—in this case, the user specifies that at least twenty vCPUs are to always be available for the user, at least seven hundred and fifty gigabytes of memory (e.g., RAM), and at least fifteen terabytes of storage (e.g., non-volatile storage). In some embodiments, users may enable both the percentage-based reservation (via user interface input elements 210) and the per-resource reservations (via user interface input elements 215), and this may cause the maximum option between the two to be reserved.

In some embodiments, the user interface 200 may also accept user input specifying how the user's resources are to be spread within the available infrastructure. In some environments, it may be beneficial to ensure that a particular set of resources—here, the user's private resources—are not deployed too "closely" to one another, such that a failure that is relatively local to one resource (e.g., a server device crash or network issue such as a physical interface failure or flap) doesn't affect any or many other resources in that set. In some use cases it may be extremely important to ensure such separation to decrease the chance of a complete system outage; thus, a user may provide input (e.g., select the "wide" radio button) to indicate that the user's resources are to be aggressively or spread as much as possible—e.g., onto different server devices, across different racks, across different rows of racks, rooms, buildings, etc. This configuration could also be enforced such that a particular level of spread must be granted before additional resources can be added/used, e.g., no resources from the set are to be placed on a same host, and if that cannot be satisfied, a resource utilization/launch request may be denied.

In other embodiments, this failure resistance may not be as important and/or increased distance between components may be problematic (e.g., for high-performance/distributed computing tasks), and thus the user may provide input (e.g., select the "medium" radio button, or a non-illustrated "low" button) to indicate that it is not as comparatively crucial to spread the user's resources, or perhaps that the user's resources should not be spread at all. Thus, the system may ensure a different amount of spread, e.g., the use of five racks of server devices of ten that are available.

The user interface 200 may also include one or more user input elements 225 allowing users to specify amounts of resources that may be utilized by control plane aspects of the deployed services, such as compute instances running control and management applications or functions. In this example, a user may be provided drop-down selection boxes providing a number of different options for how much of various resources may be used, e.g., processing amounts, memory amounts, storage amounts, similar to the elements 215 for user resource reservations. As shown, the user input elements show a value of "AUTO," allowing the deployed IEL scale the control plane as much as it sees fit, provided that resource availability exists and the user reservations remain available.

In some embodiments, when a user seeks to make their IEL at least partially public, the provider network may provide a certification process to ensure one or more of a minimal level of quality of service for users, that the proper service software, drivers, and/or versions thereof are indeed deployed or available, that proper network security is in place, that sufficient bandwidth is available, that the computing resources are of sufficient quality and/or quantity (e.g., the processors are of a suitable make or capability), and the like. In some embodiments, during the deployment of the services (or upon a subsequent enabling of public availability) the IEL site manager 122 may run checks and/or deploy agents to ensure these conditions are met, e.g., by verifying network security conditions, testing bandwidth and networking configurations, verifying software installations, performing security checks, or the like.

Turning back to FIG. 1, at circle (4) another user may deploy a set of localized services 124Y into another independent customer network 116Y to form an IEL 118 that is to be made at least partially public as described herein. Thus, the IEL site manager 122Y at circle (5) may register itself with the provider network 100 IEL tracking system 112 as described herein, e.g., by providing IEL 118 information to be stored within IEL resource information 113 at circle (6). However, as part of the registration process (of one or more messages being sent between the IEL site manager 122Y and the IEL tracking system 112) or thereafter, the IEL tracking system 112 may determine that the independent customer network 116Y might be located "nearby" another independent customer network 116X. For example, in some embodiments during the registration process each independent customer network 116 may provide one or more IP addresses associated with the respective independent customer network 116 to the IEL tracking system 112, and the IEL tracking system 112 may utilize a Geo IP tool or system to resolve each IP address to an approximate geographic location. Alternatively, or additionally, the user deploying the set of localized services may provide an indication of a location of the independent customer network 116, and/or the IEL site manager 122 may have access to geocoordinate information and send this information to the IEL tracking system 112 during registration. Regardless of the technique, the IEL tracking system 112 in some embodiments can determine that a location of the independent customer network 116Y may possibly be geographically close (e.g., within a threshold distance away) to another independent customer network 116X (e.g., by consulting stored IEL location information 115 indicating locations of the IELs), and may send a notification to one or both associated IELs identifying the other independent customer network, such as by providing an IP address of the other independent customer network.

For example, in some embodiments the IEL tracking system 112 returns the IP address of the independent customer network 116X to the IEL site manager 122Y of the independent customer network 116Y. At circle (7), the IEL site manager 122Y may send traffic to that IP address (as the destination) to determine whether the two independent customer networks 116X-116Y are sufficiently close to one another, e.g., by performing a latency analysis of network traffic between the two. For example, in some embodiments the IEL site manager 122Y may initiate a round trip time (RTT) process to evaluate how much time it takes between sending a request to the other independent customer network 116X and receiving an associated response. Similarly, the independent customer network 116X (e.g., the IEL site manager 122X) may detect the initiation of the latency analysis and perform its own test, or the independent customer network 116X may instead learn of the existence of the potentially "nearby" independent customer network 116Y via the IEL tracking system 112 itself, e.g., by asking for information about nearby IELs, by receiving a push-type notification from the IEL tracking system 112, or the like.

In some embodiments, at circle (8) each IEL site manager 122X-122Y may report back its observed RTT value(s) (or, a one-way latency calculated based on the observed RTT(s)) to the IEL manager 106, which may determine whether each latency value is less than a threshold distance (e.g., less than a threshold amount of latency, e.g., 20 ms). For example, this determination may include determining whether half of the IELs, plus one, all have a latency value satisfying the threshold. In this case, the half-plus-one condition would require that both latency values would need to satisfy the threshold.

When the condition is met, the IEL manager 106 may determine that the two independent customer networks 116X-116Y are to collectively form a "micro-region," update a micro-region information 114 store to indicate the membership for this micro-region, and notify the independent customer networks 116X-116Y of the existence of the micro-region, the identities of the members of the micro-region, and optionally the capabilities and/or resource availabilities of the independent customer network members of the micro-region, which may be cached by each IEL site manager 122.

Alternatively, in some embodiments, instead of reporting the latency values back to the IEL manager 106 at circle (8), each IEL site manager 122 may instead perform its own analysis to gauge whether its observed latency satisfies the threshold, and may send a message to the IEL manager 106 with its "vote" at circle (8) of whether the micro-region should be formed—e.g., if the latency value is less than a threshold, it votes yes; otherwise, it votes no. The IEL manager 106 may again evaluate a condition, such as the half-plus-one condition, to determine whether a sufficient number of "yes" votes exist from the potential members of the micro-region, similar to as described above.

In some embodiments, when a micro-region is formed, each pair of IELs in the micro-region may optionally create a connection (e.g., a secure tunnel such as an encrypted VPN tunnel) between the two, allowing for the two IELs to exchange information (e.g., availability information, capability information, etc.) and/or service requests to one another on an event-based or scheduled basis. Thereafter, upon a receipt of a request to perform an action within the micro-region (e.g., a "launch compute instance" type request indicating a request to launch a virtual machine by a localized hardware virtualization service 110A'), the IEL site manager 122 may identify that the launch is to be somewhere within the micro-region, and may select one of the IELs to service the request, e.g., based on determining which IEL of the micro-region has sufficient (or, the most) available capacity. Thus, if the IEL site manager selects another IEL to service the request, the IEL site manager may send the request (or a translated request that specifically identifies that other IEL as the preferred service location) to the other IEL site manager at the other location.

In some embodiments, when a user decides to share at least a portion of their infrastructure via localized services 124, the user may benefit from a provider network 100 implemented credit system. For example, when a user (of the provider network 100, or of another IEL 118) uses resources from another IEL (e.g., independent customer network 116Y), the owner of that independent customer network 116Y may be granted credits that can be used to use resources of other IELs and/or the provider network 100 itself. As a result, users are incentivized to make their infrastructure public by rewarding the behavior through allowing these users to use other IELs (e.g., for disaster recovery/backup) or other services 104 of the provider network 100. In some embodiments, the more resources that are used by other users, the more the owning user is rewarded in terms of credit—e.g., the user may be granted one credit of usage for every hour of hardware virtualization service instances run on other users' behalf, or for some amount of storage used by other users over an amount of time, etc.

In some embodiments, this accounting/credit information may be tracked by the IEL site manager 122 and reported back to the IEL manager 106 accounting system 108, e.g., on a periodic basis (e.g., once a day, once a week, once a month), or when network connectivity exists, etc. Thus, as shown by optional circle (9), the set of credits 110 may optionally be determined by the accounting system 108 and tracked therein. In such cases, at the time of an accounting/reporting synchronization between the IEL site manager 122 and the IEL manager 106, the current values of credits 110 may be passed back down to the IEL site managers 122 where they are cached. This allows the IEL site managers 122 to have recent credit information so they can make decisions whether to provide service for various customers over the next amount of time, which can be useful if network connectivity to the provider network 100 doesn't exist.

Figure 3:
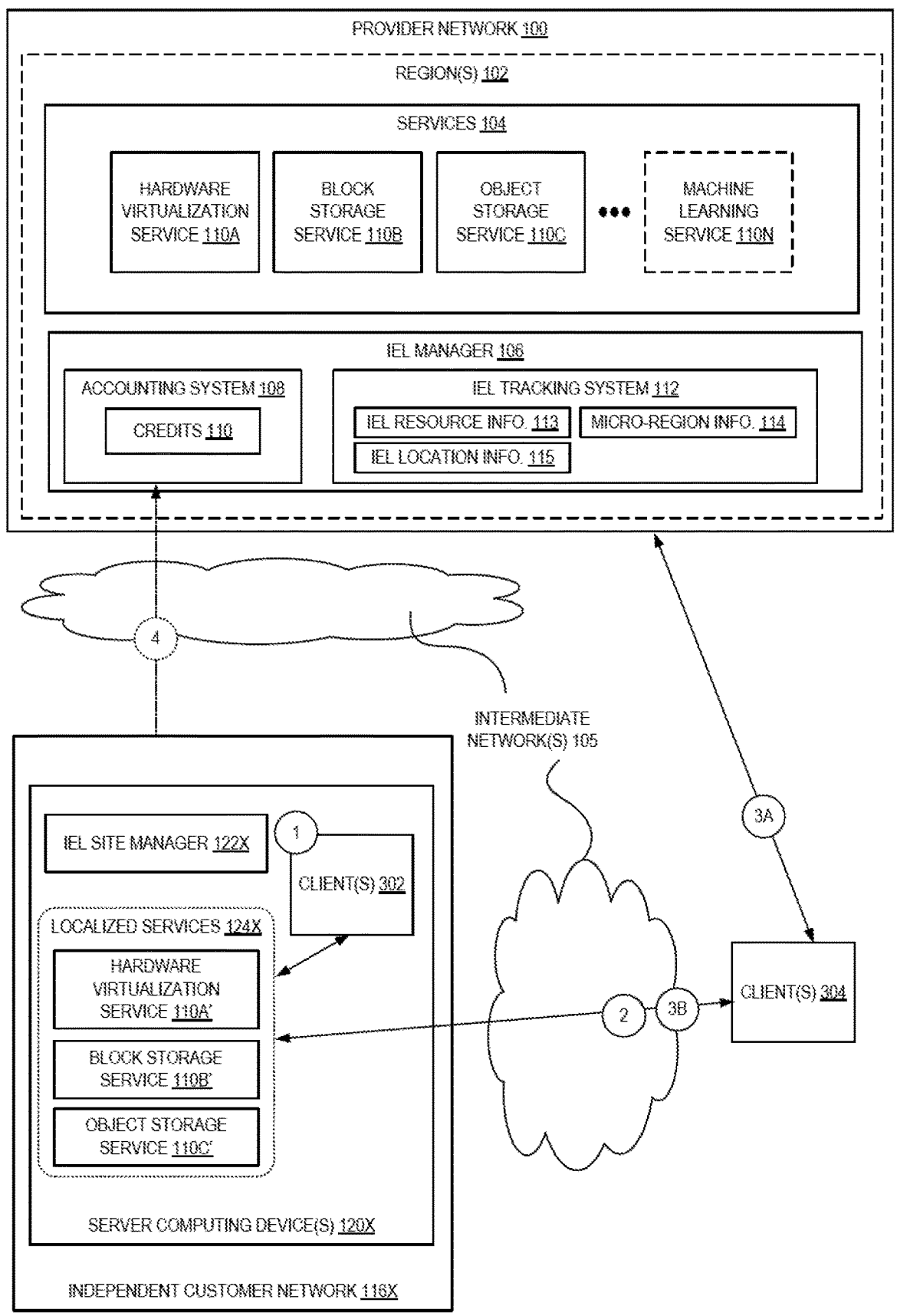
FIG. 3 is a diagram illustrating an environment for utilizing computing resources provided by an independent edge location of a service provider network according to some embodiments.

FIG. 3 is a diagram illustrating an environment for utilizing computing resources provided by an independent edge location of a service provider network according to some embodiments. As indicated herein, in some embodiments, upon deploying one or more localized services 124X, the user may be notified of one or more endpoints (e.g., associated with one or more IP addresses) associated with the localized services 124X. Thereafter, the user may configure a client 302 and/or client 304 to issue requests—e.g., using the same or similar APIs or function calls provided by the corresponding services 104 in the provider network 100—using an endpoint address. The requests may thus be routed directly to the associated service via the endpoint, or through another entity (e.g., the IEL site manager 122X) on to the particular service 124. As shown, a "local" client 302 within the independent customer network 116X may issue requests at circle (1) to use the localized services 124X, and at circle (2) a client 304 outside the independent customer network 116X may similarly issue requests to utilize the services, e.g., using a publicly-routable endpoint IP address.

However, in some embodiments, the client 304 at circle (3A) may send a request to enable the use of micro-regions or may already have micro-regions made available for the client's account, and the client may issue a request to perform service discovery, e.g., a "describe regions" request seeking identifiers of different endpoints that are available to the client. The returned information may include identifiers of endpoints associated with the regions 102 of the cloud provider network and may also include identifiers of endpoints associated with IELs. Thus, at circle (3B), the client 304 may decide to use an IEL and send a request on to the particular associated service at the independent customer network 116X. As is described above, records and/or accounting information involving this usage may be passed, at some point in time reflected by circle (4), by the IEL site manager 122X back to the accounting system 108 of the IEL manager 106 so that all necessary accounting, bookkeeping, and the like can be performed.

Figure 4:
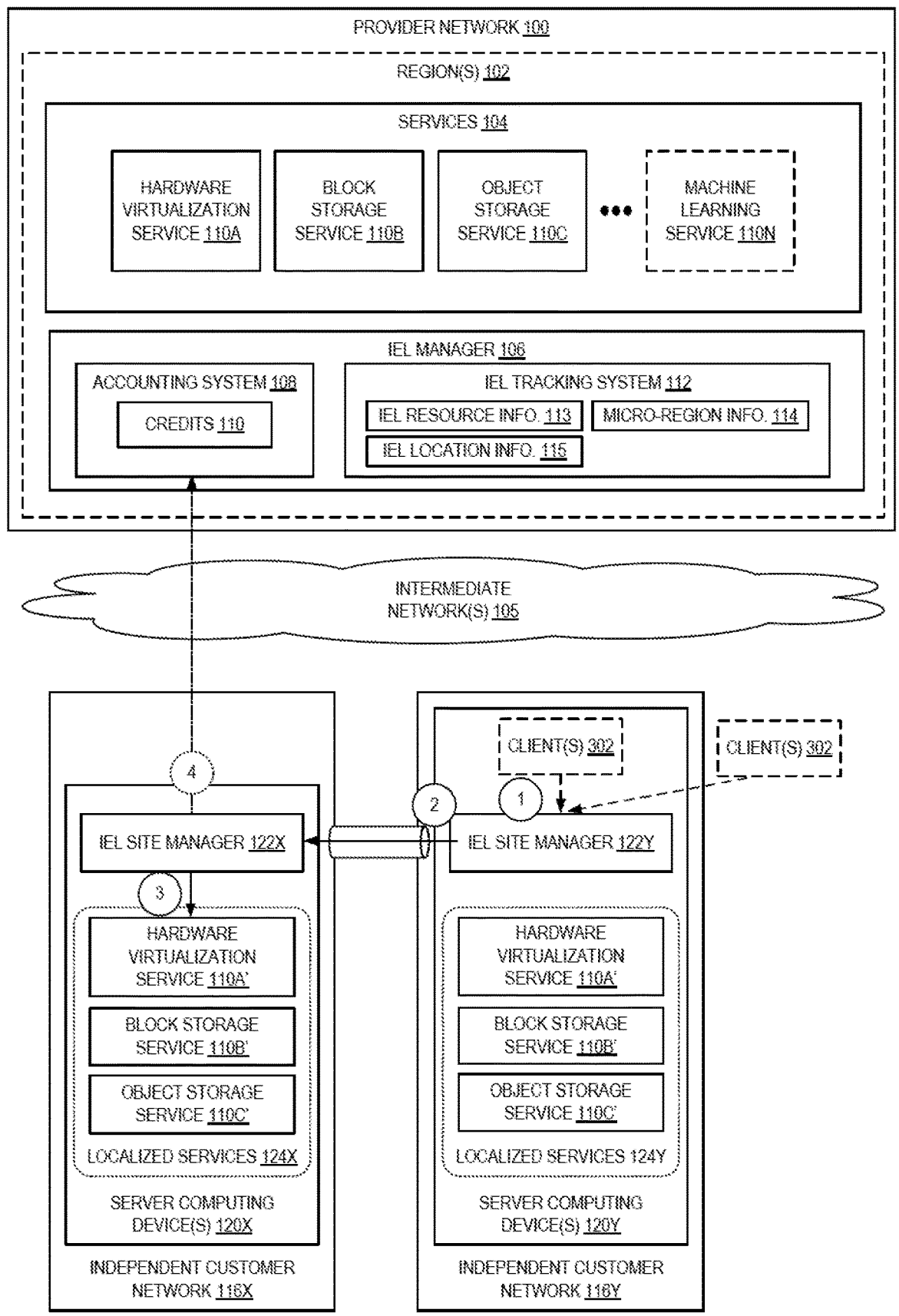
FIG. 4 is a diagram illustrating an environment for utilizing computing resources across independent edge locations of a service provider network according to some embodiments.

FIG. 4 is a diagram illustrating an environment for utilizing computing resources across independent edge locations of a service provider network according to some embodiments. In this example, a client 302 within or outside the independent customer network 116Y seeks to launch a compute instance within another independent customer network 116X. The client 302 may send a request, at circle (1), to the IEL site manager 122Y indicating that the desired location for the launch is the independent customer network 116X. The IEL site manager 122Y can, upon detecting the identifier of the independent customer network 116X, send a request (e.g., via a secure tunnel) at circle (2) to the IEL site manager 122X, which may include a capacity and/or placement engine capable of determining whether the launch may occur, and if so, on which of the server computing device 120X the instance should be placed. If the launch may occur, at circle (3) the IEL site manager 122X can cause the hardware virtualization service 110A' to launch the instance at the location and a result can be passed back to the IEL site manager 122Y (and thus back to the client 302) indicating that the placement occurred. If the launch is unable to occur (e.g., due to insufficient capacity), the IEL site manager 122Y may similarly send a message back to the IEL site manager 122Y (and thus back to the client 302) indicating that insufficient capacity existed. One more, at some point in time the accounting information pertaining to the launch of the instance and the continued use thereof can be reported at circle (4) back to the accounting system 108, which may periodically update credits 110 and/or performing billing tasks.

Figure 5:
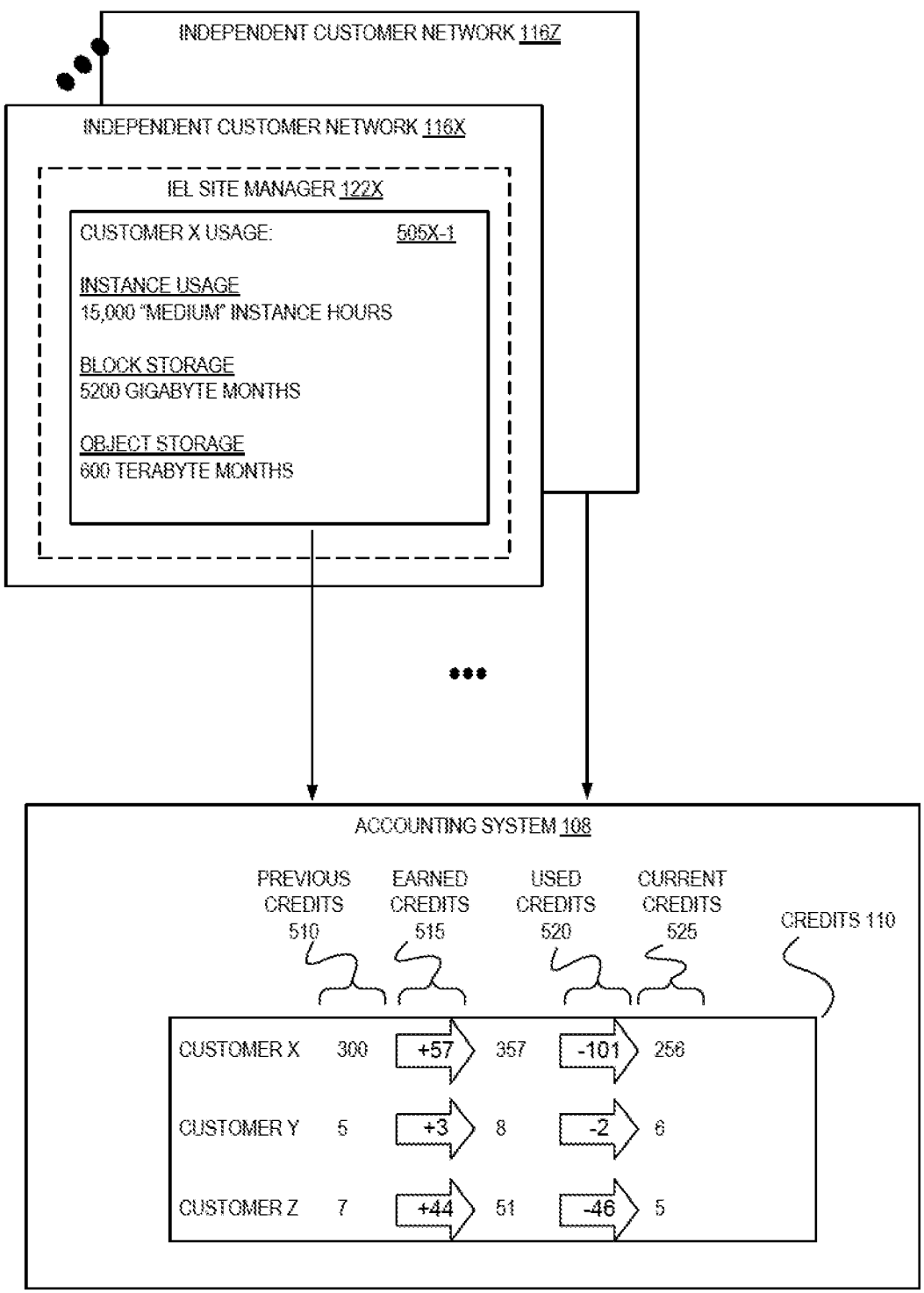
FIG. 5 is a diagram illustrating an environment for credit-based accounting for independent edge locations of a service provider network according to some embodiments.

FIG. 5 is a diagram illustrating an environment for credit-based accounting for independent edge locations of a service provider network according to some embodiments. In this example, a first independent customer network 116X is shown as reporting back accounting information 505X-1 that indicates usage of the independent customer network 116X by a "customer X"—in this case, aggregate numbers are shown that reflect 15,000 "medium" instance hours were utilized by customer X; 5,200 gigabyte months of block storage were used by customer Y; and 600 terabyte months of object storage were used by customer X. Of course, the types and values of this accounting information 505X are merely exemplary, and many other types and values of data may be passed, such as additional information for other customers, or information in other formats (e.g., more or less specific levels of granularity).

In this example, the accounting system 108 may adjust the credits 110 information based on (at least) this usage. For example, customer X may have had three-hundred previous credits 510, but due to other users utilizing resources of a IEL of customer X, customer X may have gained fifty-seven earned credits 515, and as a result of the reported usage from one or multiple independent customer networks 116, customer X may have used 101 credits 520, resulting in a net new amount of credits available to customer X as being two hundred fifty-six. Similar processes may be performed for other customers, resulting in customer credit information being updated on a periodic basis, and optionally sent to the independent customer networks 116 to be cached and relied upon for subsequent requests involving these customers.

In some embodiments, customers may utilize or configure a credit retention or conversion policy indicating whether and when to convert existing credits into another form of credit, e.g., a financial adjustment to an account of the customer. This policy could indicate that the customer does not wish to receive credits and thus, earned credits should immediately be converted into a financial adjustment to the customer account. The policy could alternatively indicate that the customer wishes for credits that are unused after an amount of time to be converted, etc.

Figure 6:
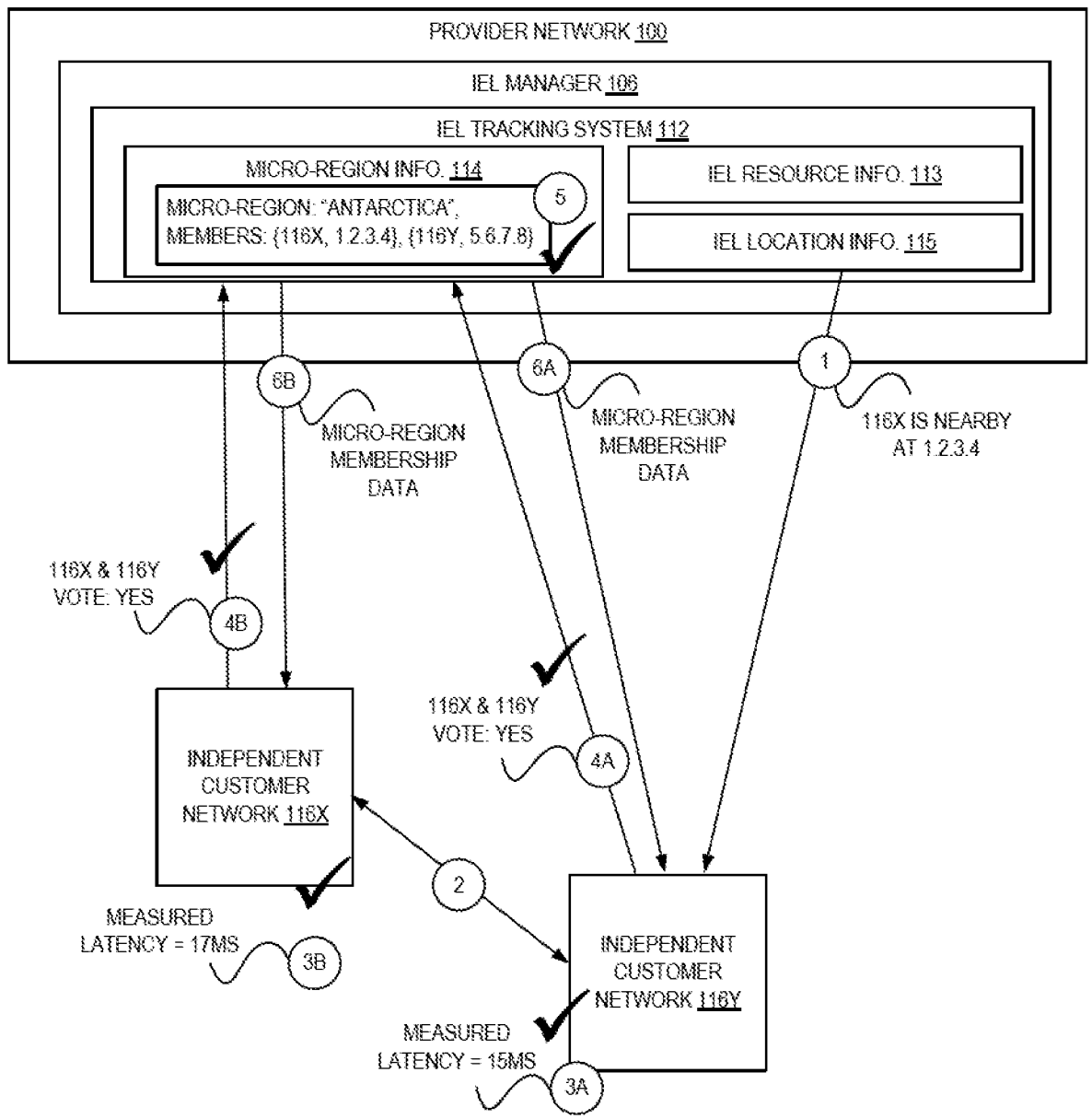
FIG. 6 is a diagram illustrating an environment for dynamic micro-region formation for service provider network independent edge locations according to some embodiments.

As described herein, in some embodiments IELs may dynamically be consolidated into micro-regions within sufficiently "nearby" other IELs. FIG. 6 is a diagram illustrating an environment for dynamic micro-region formation for service provider network independent edge locations according to some embodiments. In this example, after deploying services and registering itself with the IEL manager 106, the independent customer network 116Y may receive, at circle (1), an indication from the IEL tracking system 112 that another independent customer network 116X is nearby, reachable at IP address 1.2.3.4. Thereafter, at circle (2), the independent customer network 116Y may initiate a latency/distance measurement using the IP address, and similarly the independent customer network 116X may also perform a latency/distance measurement. In this example, at circle (3A) the independent customer network 116Y measures the one-way latency at 15 ms, whereas at circle (3B) the independent customer network 116X measures the one-way latency at 17 ms. Based on a configured threshold (e.g., latency must be less than 20 ms), each independent customer network 116X-116Y may send a "yes" vote regarding micro-region formation at circles (4A) and (4B); in response, the IEL tracking system 112 may define a micro-region at circle (5) as part of micro-region information 114—here, identifying a micro-region name/location of "Antarctica" and a set of IEL member data—here, identifiers of each IEL and an IP address associated therewith. At circles (6A)/(6B), the IEL tracking system 112 may report back the positive formation of the micro-region to these independent customer networks 116X-116Y. In this manner, clients—whether connected to the provider network 100 or either of the independent customer networks 116X-116Y—can perform actions involving the micro-region, and one of the independent customer networks 116X-116Y can be selected to perform the action (e.g., create a storage location/bucket, run an instance, etc.).

Figure 7:
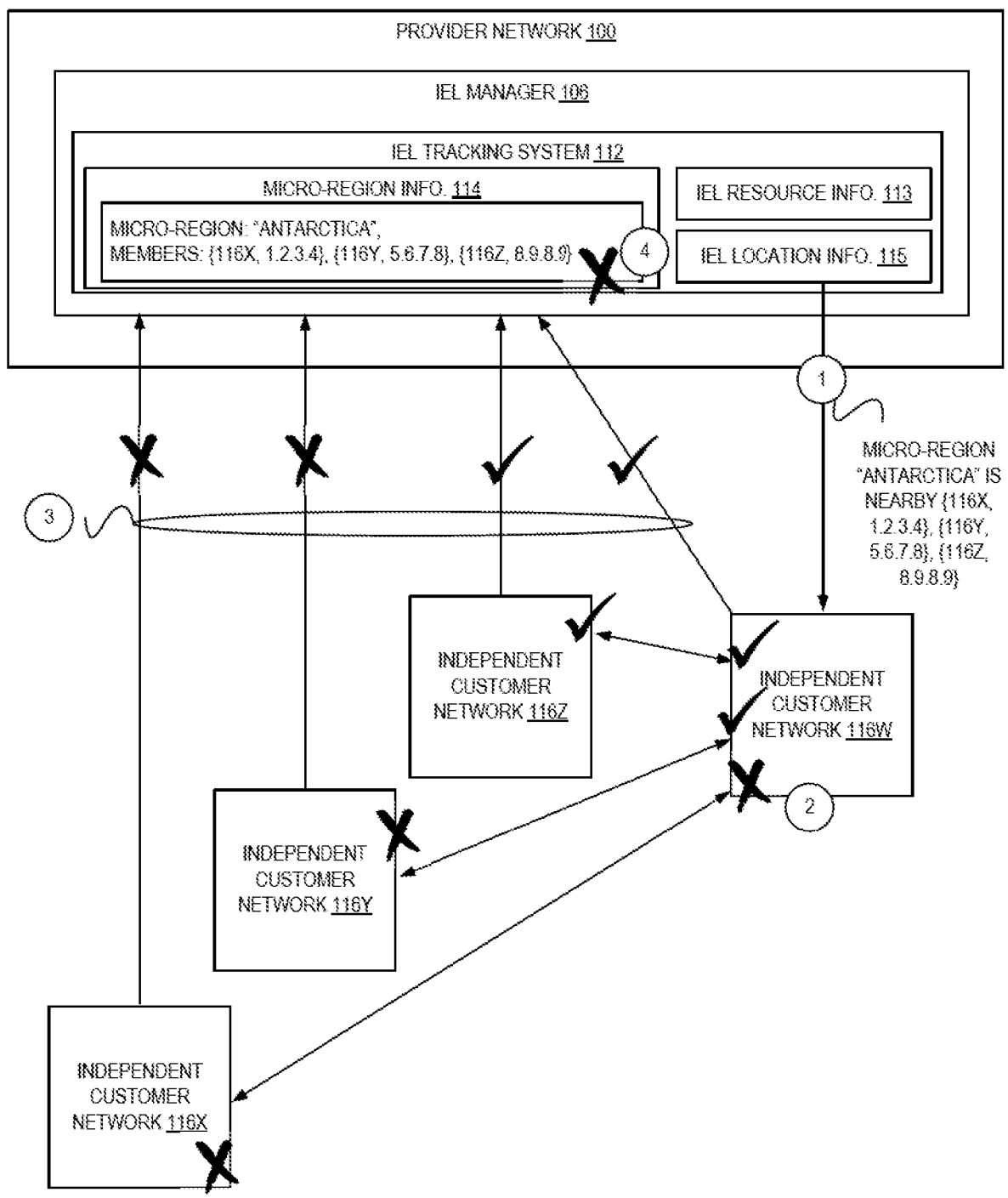
FIG. 7 is a diagram illustrating an environment for dynamic micro-region formation for service provider network independent edge locations according to some embodiments.

A more complex example is shown in FIG. 7, which is a diagram illustrating an environment for dynamic micro-region formation for service provider network independent edge locations according to some embodiments. In this example, at circle (1) upon registration the independent customer network 116W is provided a notification that a micro-region might be nearby it—here, "Antarctica" that has three existing members. The independent customer network 116W may initiate a distance/latency test with each of the members, and as shown at circle (2) from the independent customer network 116W perspective, two of the three members may be within the threshold distance/latency away. However, from the perspective of the other members, only one of the three views the independent customer network 116W as being within the threshold distance/latency. Accordingly, at circle (3), two independent customer networks 116Z/116W vote "yes" while two independent customer networks 116X/116Y vote "no." At circle (4), via evaluating a half-plus-one condition, the IEL tracking system 112 determines that only two networks voted yes, while the half-plus-one condition mandates that 2+1=3 networks must vote yes for the independent customer network 116W to be admitted into the micro-region. Accordingly, the independent customer network 116W is not added.

Figure 8:
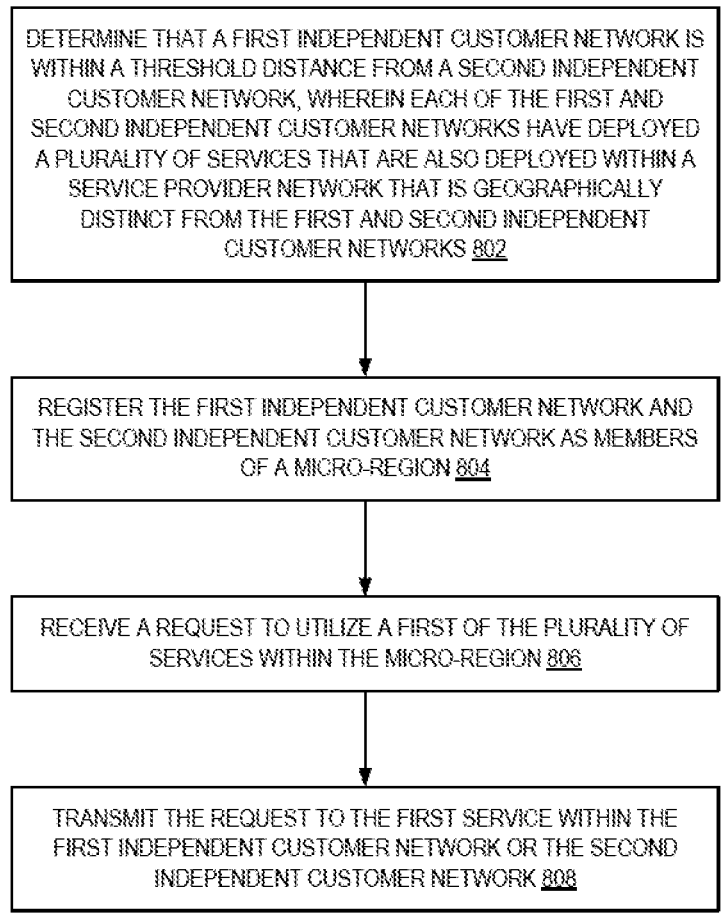
FIG. 8 is a flow diagram illustrating operations of a method involving dynamic micro-region formation for service provider network independent edge locations according to some embodiments.

FIG. 8 is a flow diagram illustrating operations of a method involving dynamic micro-region formation for service provider network independent edge locations according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, ones of the operations 800 are performed by the control plane 107 (e.g., IEL manager 106) and/or independent customer networks 116 of the other figures.

The operations 800 include, at block 802, determining that a first independent customer network is within a threshold distance from a second independent customer network, wherein each of the first and second independent customer networks have deployed a plurality of services that are also deployed within a service provider network that is geographically distinct from the first and second independent customer networks.

In some embodiments, the plurality of services are deployed into the first independent customer network using a software installation package, the software installation package including a set of base machine images or identifiers of one or more locations where the set of base machine images can be obtained, wherein the deployment includes launching one or more compute resources (e.g., containers, compute instances such as VMs, etc.) using the set of base machine images.

In some embodiments, block 802 includes determining that at least one measured latency between the first independent customer network and the second independent customer network is less than the threshold distance, wherein the threshold distance is an amount of time. In some embodiments, determining that at least one measured latency between the first independent customer network and the second independent customer network is less than the threshold distance comprises: receiving a first vote from the first independent customer network indicating that a first measured latency between the first and second independent customer networks, as determined in the first independent customer network, is less than the threshold distance amount of time; and receiving a second vote from the second independent customer network indicating that a second measured latency between the first and second independent customer networks, as determined in the second independent customer network, is less than the threshold distance amount of time.

The operations 800 further include, at block 804, registering the first independent customer network and the second independent customer network as members of a micro-region.

The operations 800 further include, at block 806, receiving a request to utilize a first of the plurality of services within the micro-region; and at block 806, transmitting the request to the first service within the first independent customer network or the second independent customer network. The request may be a variety of types of requests seeking the performance of a variety of types of operations by a variety of different services based on the particular embodiment, for example, a request for a hardware virtualization service to launch/run or terminate a compute instance; a request for a hardware virtualization service to describe or modify characteristics of a compute instance or group thereof; a request for a hardware virtualization service to allocate, describe, modify, reserve, release, etc., a set of physical host computing devices for a customer; a request for a hardware virtualization service to create, copy, modify, register, etc., a machine image of a compute instance; a request for an object storage service to create a storage location (e.g., a folder or bucket), store a data object (e.g., a file) to a storage location, list the contents of data objects in a storage location, etc.; a request for a block storage service to attach, create, delete, modify, etc., a storage volume; a request for a block storage service to create, delete modify, reset, etc., a snapshot of a volume;

In some embodiments, the operations 800 further include receiving, at the service provider network, one or more registration messages transmitted from the first independent customer network, the one or more registration messages including at least a first Internet Protocol (IP) address associated with the first independent customer network and one or more resource availability amounts; identifying the second independent customer network based at least in part on a second IP address associated with the second independent customer network and the first IP address associated with the first independent customer network; and transmitting the second IP address or an identifier of the second independent customer network to the first independent customer network.

In some embodiments, the operations 800 further include receiving, at a point in time while the first independent customer network does not have network connectivity to the service provider network, a second request to perform a function via a second of the plurality of services deployed within the first independent customer network; and performing the function via the second service within the first independent customer network while the first independent customer network does not have network connectivity to the service provider network.

In some embodiments, the operations 800 further include receiving, at the first independent customer network, a second request to perform a function via the first of the plurality of services deployed within the second independent customer network; and transmitting, by the first independent customer network to the second independent customer network, the second request.

In some embodiments, the operations 800 further include receiving a resource sharing configuration for the first independent customer network, the resource sharing configuration indicating whether usage of the plurality of services is to be made publicly available to other users not directly associated with the first independent customer network. In some embodiments, the resource sharing configuration further indicates at least one of: a percentage value indicating what percentage of computing resources associated with the first independent customer network are to be either publicly available or reserved; or one or more resource amounts corresponding to one or more minimum amounts of computing resources that are to be reserved.

In some embodiments, the operations 800 further include receiving, at the service provider network from the first independent customer network, a first one or more utilization values indicating amounts of utilization associated with the first independent customer network by a first one or more users over a period of time; and increasing a credit value for an account associated with the first independent customer network based on the first one or more utilization values, wherein the credit value indicates an amount of resource usage available for the account at one or more locations outside of the first independent customer network.

In some embodiments, the operations 800 further include selecting, for the request, the first independent customer network based on the first independent customer network having a larger amount of resource availability than the second independent customer network, wherein transmitting the request to the first service within the first independent customer network or the second independent customer network comprises transmitting the request to the first service within the first independent customer network.

In some embodiments, the operations 800 further include causing one or more certification processes to be executed within the first independent customer network, the one or more certification processes seeking to verify one or more deployment characteristics; and prior to registering the first independent customer network within the micro-region or prior to allowing non-associated users to utilize the first independent customer network, determining that the one or more certification processes verified the one or more deployment characteristics.

Figure 9:
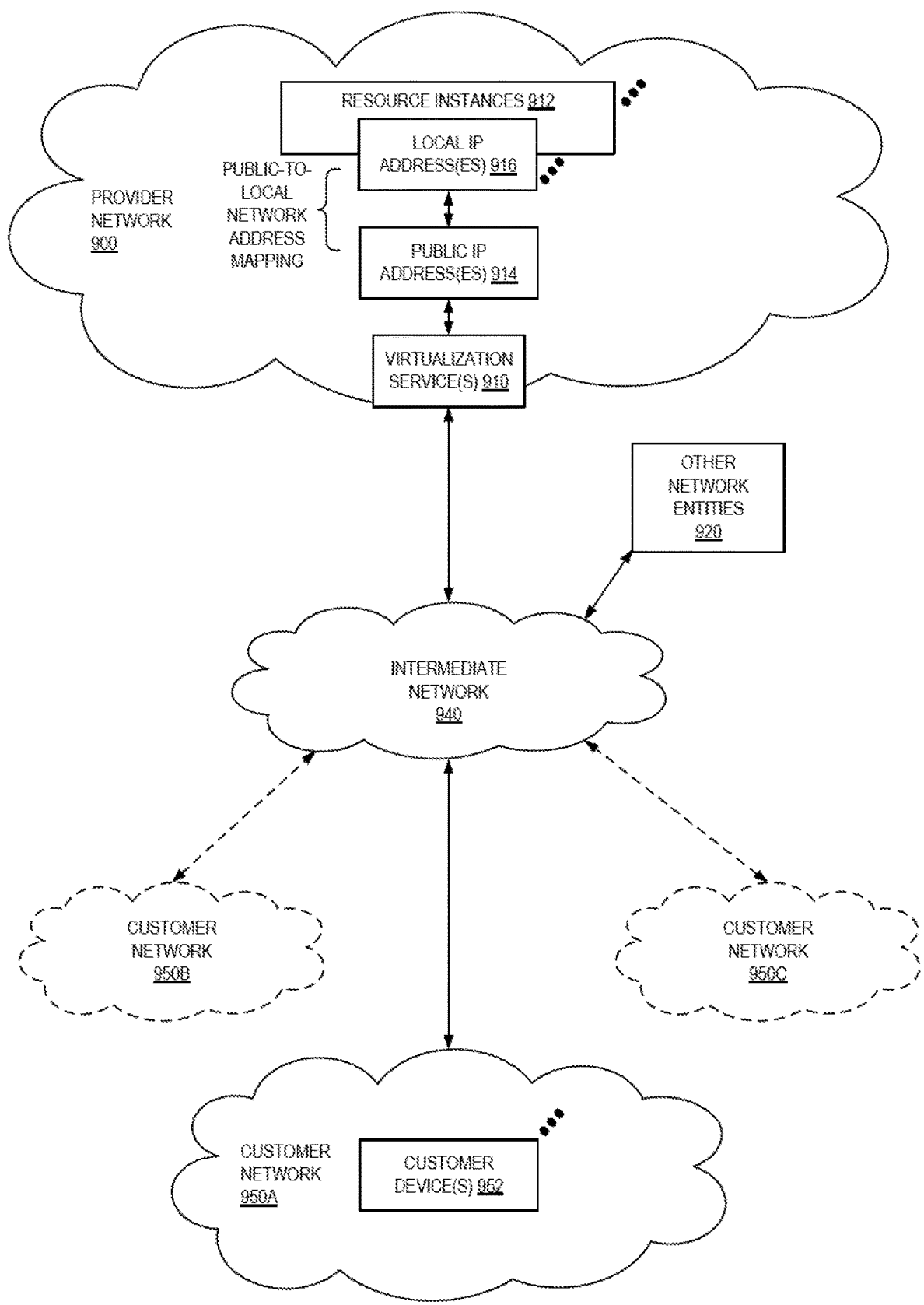
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
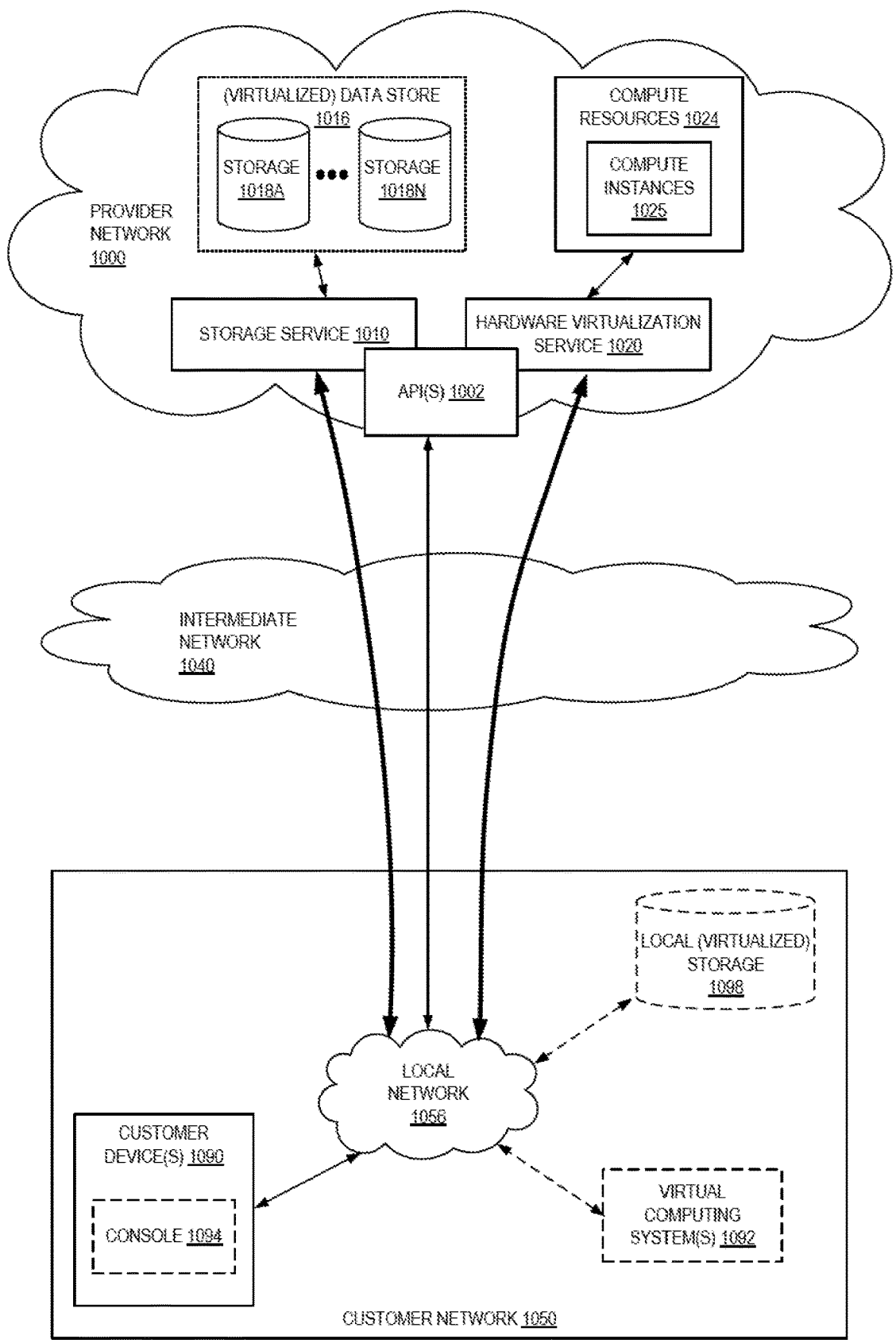
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple compute resources 1024 (e.g., compute instances 1025 such as VMs) to customers. The compute resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the compute resources 1024 to public Internet destinations, and from public Internet sources to the local IP addresses of compute resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
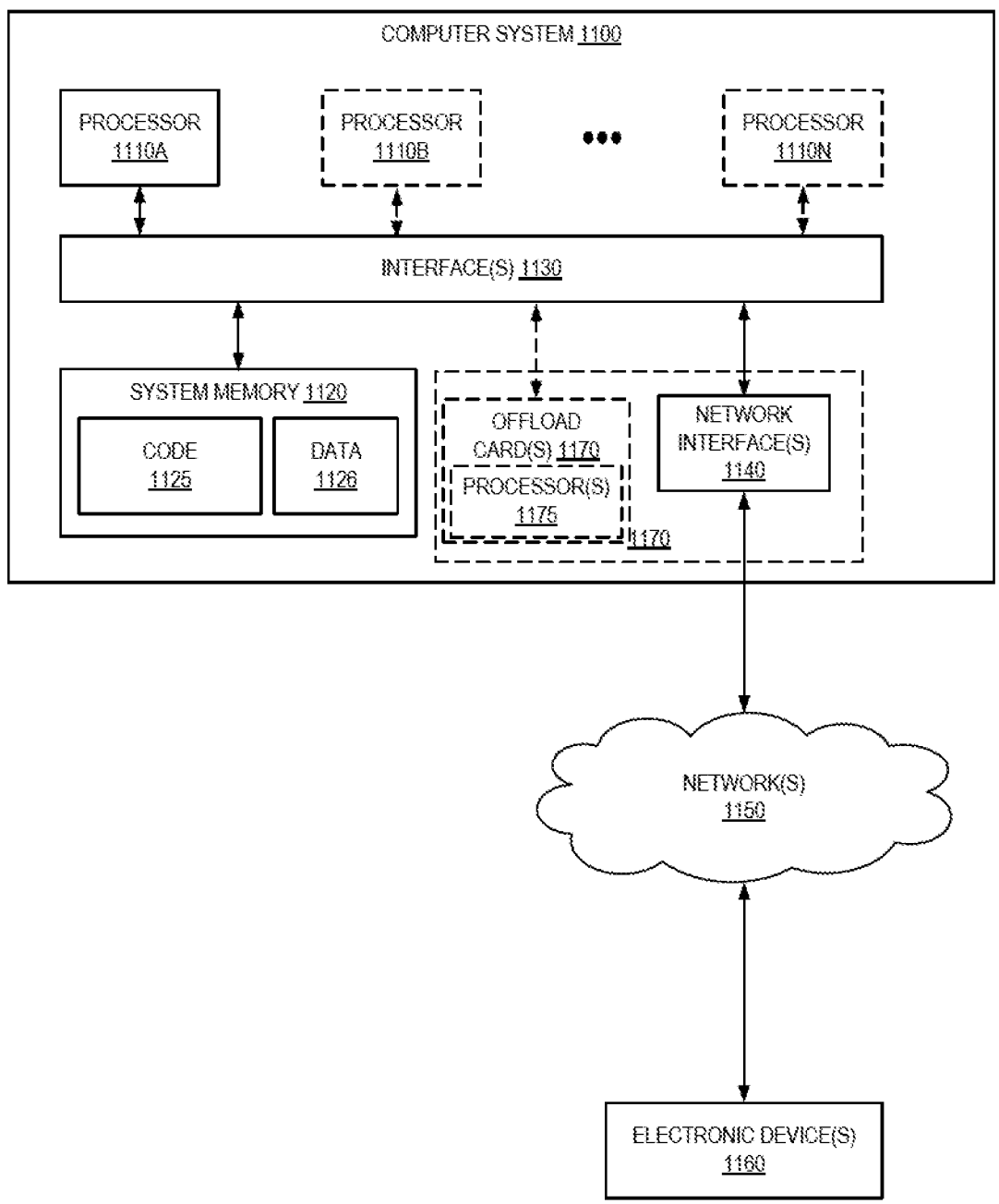
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    providing software to a first customer and to a second customer, wherein the software when executed implements at least some control plane functionality to provide a plurality of services that are also provided by a service provider network;
    deploying, in a first independent customer network based on use of the software, the plurality of services that are also deployed within the service provider network that is geographically distinct from the first independent customer network, each of the plurality of services implementing a web services interface allowing clients to utilize the service;
    sending, from the first independent customer network to the service provider network, one or more messages including a first Internet Protocol (IP) address associated with the first independent customer network and one or more resource availability amounts associated with the deployment of the plurality of services in the first independent customer network;

receiving, from the service provider network, a second IP address associated with a second independent customer network, wherein the second independent customer network also implements the plurality of services;

communicating, by the first independent customer network with the second independent customer network via use of the second IP address, to determine a latency time between the first and second independent customer networks;

transmitting a message to the service provider network including the latency time or indicating that the latency time is beneath a threshold;

determining that the first independent customer network and the second independent customer network are members of a micro-region;

receiving a request, via the second independent customer network, to perform a function via a first of the plurality of services, wherein the request was originally received at the second independent customer network and specified that the function was to be performed within the micro-region; and servicing the request by the first service within the first independent customer network.

2. The computer-implemented method of claim 1, wherein at a time of servicing the request, the first independent customer network did not have network connectivity to the service provider network.

3. The computer-implemented method of claim 1, further comprising:

receiving a resource sharing configuration for the first independent customer network, the resource sharing configuration indicating that usage of the plurality of services is to be made publicly available to other users not directly associated with the first independent customer network, the resource sharing configuration further specifying at least one of:
  a percentage value indicating what percentage of computing resources associated with the first independent customer network are to be either publicly available or reserved; or
  one or more resource amounts corresponding to one or more minimum amounts of computing resources that are to be reserved.

4. A computer-implemented method comprising:

providing software to a first customer and to a second customer, wherein the software when executed implements at least some control plane functionality to provide a plurality of services that are also provided by a service provider network;

determining that a first independent customer network associated with the first customer is within a threshold distance from a second independent customer network associated with the second customer, wherein each of the first and second independent customer networks have deployed the software to implement the plurality of services that are also deployed within the service provider network, wherein the service provider network is geographically distinct from the first and second independent customer networks;

registering, based at least in part on the determination, the first independent customer network and the second independent customer network as members of a micro-region;

receiving a request to utilize a first of the plurality of services within the micro-region; and transmitting the request to the first service within the first independent customer network or the second independent customer network.

5. The computer-implemented method of claim 4, wherein the plurality of services are deployed into the first independent customer network using a software installation package, the software installation package including a set of base machine images or identifiers of one or more locations where the set of base machine images can be obtained, wherein the deployment includes launching one or more compute resources using the set of base machine images.

6. The computer-implemented method of claim 4, further comprising:

receiving, at the service provider network, one or more registration messages transmitted from the first independent customer network, the one or more registration messages including at least a first Internet Protocol (IP) address associated with the first independent customer network and one or more resource availability amounts;

identifying the second independent customer network based at least in part on a second IP address associated with the second independent customer network and the first IP address associated with the first independent customer network; and transmitting the second IP address or an identifier of the second independent customer network to the first independent customer network.

7. The computer-implemented method of claim 4, wherein determining that the first independent customer network is within the threshold distance from the second independent customer network includes:

determining that at least one measured latency between the first independent customer network and the second independent customer network is less than the threshold distance, wherein the threshold distance is an amount of time.

8. The computer-implemented method of claim 7, wherein determining that at least one measured latency between the first independent customer network and the second independent customer network is less than the threshold distance comprises:

receiving a first vote from the first independent customer network indicating that a first measured latency between the first and second independent customer networks, as determined in the first independent customer network, is less than the threshold distance amount of time; and receiving a second vote from the second independent customer network indicating that a second measured latency between the first and second independent customer networks, as determined in the second independent customer network, is less than the threshold distance amount of time.

9. The computer-implemented method of claim 4, further comprising:

receiving, at a point in time while the first independent customer network does not have network connectivity to the service provider network, a second request to perform a function via a second of the plurality of services deployed within the first independent customer network; and performing the function via the second service within the first independent customer network while the first independent customer network does not have network connectivity to the service provider network.

10. The computer-implemented method of claim 4, further comprising:
receiving, at the first independent customer network, a second request to perform a function via the first of the plurality of services deployed within the second independent customer network; and
transmitting, by the first independent customer network to the second independent customer network, the second request.

11. The computer-implemented method of claim 4, further comprising:
receiving a resource sharing configuration for the first independent customer network, the resource sharing configuration indicating whether usage of the plurality of services is to be made publicly available to other users not directly associated with the first independent customer network.

12. The computer-implemented method of claim 11, wherein the resource sharing configuration further indicates at least one of:
a percentage value indicating what percentage of computing resources associated with the first independent customer network are to be either publicly available or reserved; or
one or more resource amounts corresponding to one or more minimum amounts of computing resources that are to be reserved.

13. The computer-implemented method of claim 4, further comprising:
receiving, at the service provider network from the first independent customer network, a first one or more utilization values indicating amounts of utilization associated with the first independent customer network by a first one or more users over a period of time; and
modifying a credit value for an account associated with the first independent customer network based on the first one or more utilization values, wherein the credit value indicates an amount of resource usage available for the account at one or more locations outside of the first independent customer network.

14. The computer-implemented method of claim 4, further comprising:
selecting, for the request, the first independent customer network based on the first independent customer network having a larger amount of resource availability than the second independent customer network,
wherein transmitting the request to the first service within the first independent customer network or the second independent customer network comprises transmitting the request to the first service within the first independent customer network.

15. The computer-implemented method of claim 4, further comprising:
causing one or more certification processes to be executed within the first independent customer network, the one or more certification processes seeking to verify one or more deployment characteristics; and
prior to registering the first independent customer network within the micro-region or prior to allowing non-associated users to utilize the first independent customer network, determining that the one or more certification processes verified the one or more deployment characteristics.

16. The computer-implemented method of claim 4, wherein:
the first service is a hardware virtualization service; and the request to utilize the hardware virtualization service comprises a request to launch a compute instance.

17. A system comprising:
a first one or more electronic devices in a first independent customer network associated with a first customer to implement, based on use of software, a plurality of services that are also implemented in a multi-tenant service provider network that is geographically distinct from the first independent customer network;
a second one or more electronic devices in a second independent customer network associated with a second customer to implement, based on use of the software, the plurality of services that are also implemented in the multi-tenant service provider network, the multi-tenant service provider network being geographically distinct from the second independent customer network;
a third one or more electronic devices to implement a control plane in the multi-tenant service provider network, the control plane including instructions that upon execution cause the control plane to:
provide the software to the first customer and to the second customer, wherein the software when executed implements at least some control plane functionality to provide the plurality of services that are also provided by the multi-tenant service provider network;
determine that the first independent customer network is within a threshold distance from the second independent customer network;
register, based at least in part on the determination, the first independent customer network and the second independent customer network as members of a micro-region;
receive a request to utilize a first of the plurality of services within the micro-region; and
transmit the request to the first service within the first independent customer network or the second independent customer network.

18. The system of claim 17, wherein the control plane further includes instructions that upon execution cause the control plane to:
receive one or more registration messages transmitted from the first independent customer network, the one or more registration messages including at least a first Internet Protocol (IP) address associated with the first independent customer network and one or more resource availability amounts;
identify the second independent customer network based at least in part on a second IP address associated with the second independent customer network and the first IP address associated with the first independent customer network; and
transmit the second IP address or an identifier of the second independent customer network to the first independent customer network.

19. The system of claim 17, wherein to determine that the first independent customer network is within the threshold distance from the second independent customer network, the control plane is caused to:
determine that at least one measured latency between the first independent customer network and the second independent customer network is less than the threshold distance, wherein the threshold distance is an amount of time.

20. The system of claim 17, wherein the control plane further includes instructions that upon execution cause the control plane to:
  select, for the request, the first independent customer network based on the first independent customer network having a larger amount of resource availability than the second independent customer network.

* * * * *